United States Patent
Gao et al.

(10) Patent No.: US 11,482,257 B2
(45) Date of Patent: Oct. 25, 2022

(54) IMAGE DISPLAY METHOD AND APPARATUS

(71) Applicant: BEIJING BYTEDANCE NETWORK TECHNOLOGY CO., LTD., Beijing (CN)

(72) Inventors: Chao Gao, Beijing (CN); Jing Xie, Beijing (CN); Lei Si, Beijing (CN); He Guo, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/422,965

(22) PCT Filed: Dec. 23, 2019

(86) PCT No.: PCT/CN2019/127598
§ 371 (c)(1),
(2) Date: Jul. 14, 2021

(87) PCT Pub. No.: WO2020/147521
PCT Pub. Date: Jul. 23, 2020

(65) Prior Publication Data
US 2022/0148624 A1 May 12, 2022

(30) Foreign Application Priority Data
Jan. 15, 2019 (CN) .......................... 201910037110.8

(51) Int. Cl.
*H04N 9/80* (2006.01)
*G11B 27/10* (2006.01)
(Continued)

(52) U.S. Cl.
CPC ............ *G11B 27/102* (2013.01); *G06V 20/46* (2022.01); *G11B 20/00007* (2013.01); *H04N 19/44* (2014.11); *G11B 2020/00072* (2013.01)

(58) Field of Classification Search
CPC ............ G11B 27/102; G11B 20/00007; G11B 2020/00072; G06V 20/46; H04N 19/44
(Continued)

(56) References Cited

U.S. PATENT DOCUMENTS

2011/0218997 A1  9/2011  Boiman et al.
2015/0212762 A1  7/2015  Nakamura et al.

FOREIGN PATENT DOCUMENTS

CN  102780919 A  11/2012
CN  103024561 A  4/2013
(Continued)

OTHER PUBLICATIONS

Zhang Xiao-Yu; "Challenges and Directiontowards Secure Communication in the SCADA System"; Communications Technology; vol. 47 No. 7; Jul. 2014; p. 713-717 (contains English Abstract).
(Continued)

*Primary Examiner* — Robert Chevalier
(74) *Attorney, Agent, or Firm* — BakerHostetler (57) ABSTRACT

Disclosed in embodiments of the present disclosure are a method and an apparatus used for image display. A specific embodiment of the present method comprises: determining a selected time point of a user performing adjustment of playback progress of a target video, the target video comprising a key frame set; determining a target key frame in the key frame set, a difference between a time point corresponding to the target key frame and the selected time point meeting a first pre-determined condition; on the basis of the target key frame, performing decoding of a video frame corresponding to the selected time point, obtaining a
(Continued)

decoded video frame; displaying the decoded video frame in a first target display region. The present embodiment increases flexibility of video frame display, and helps increase user positioning and video frame processing effectiveness.

15 Claims, 5 Drawing Sheets

(51) Int. Cl.
*H04N 19/44* (2014.01)
*G11B 20/00* (2006.01)
*G06V 20/40* (2022.01)

(58) Field of Classification Search
USPC ........ 386/241, 248, 278, 326, 328, 329, 330
See application file for complete search history.

(56) References Cited

FOREIGN PATENT DOCUMENTS

| | | |
|---|---|---|
| CN | 104618794 A | 5/2015 |
| CN | 104918120 A | 9/2015 |
| CN | 104918136 A | 9/2015 |
| CN | 105208463 A | 12/2015 |
| CN | 105635844 A | 6/2016 |
| CN | 105898588 A | 8/2016 |
| CN | 107197182 A | 9/2017 |
| CN | 107995974 A | 5/2018 |
| CN | 108337546 A | 7/2018 |
| CN | 108401188 A | 8/2018 |
| CN | 108431724 A | 8/2018 |
| CN | 108737908 A | 11/2018 |
| CN | 108965907 A | 12/2018 |
| JP | 109905749 A * | 6/2019 |
| JP | 110213642 A * | 9/2019 |
| KR | 2006-0090481 A | 8/2006 |

OTHER PUBLICATIONS

International Patent Application No. PCT/CN2019/127598; Int'l Search Report; dated Mar. 23, 2020; 2 pages.

* cited by examiner

IMAGE DISPLAY METHOD AND APPARATUS

CROSS REFERENCE OF RELATED APPLICATION

The present application is a national phase application of PCT international patent application PCT/CN2019/127598, filed on Dec. 23, 2019, which claims the priority to Chinese Patent Application No. 201910037110.8, titled "IMAGE DISPLAY METHOD AND APPARATUS", filed on Jan. 15, 2019 with the China National Intellectual Property Administration, both of which are incorporated herein by reference in their entireties.

FIELD

The present disclosure relates to the technical field of computers, and in particular to a method and an apparatus for displaying an image.

BACKGROUND

With the development of internet technology, there are increasing demands for watching and recording videos using terminals such as mobile phones, and tablet computers. Video frames included in a video may be processed with the conventional image processing technology. For example, a recorded video may be processed, for example, adding special effects to the video. Generally, in order to help a user in accurately positioning a to-be-processed video frame in a video, the video is preprocessed to set more key frames from the video frames included in the video according to the conventional method. Since the key frame is decoded quickly, the user can quickly preview the video by dragging a progress bar after setting more key frames, thereby positioning a to-be-processed video frame.

SUMMARY

A method and an apparatus for displaying an image are provided according to the embodiments of the present disclosure.

In a first aspect, a method for displaying an image is provided according to an embodiment of the present disclosure. The method includes: determining a selected time point in a process that a user adjusts a play progress of a target video, where the target video includes a key frame set; determining a target key frame from the key frame set, where a difference between a time point corresponding to the target key frame and the selected time point meets a first predetermined condition; decoding a video frame corresponding to the selected time point based on the target key frame to obtain a decoded video frame; and displaying the decoded video frame in a first target display region.

In some embodiments, the determining a selected time point in a process that a user adjusts a play progress of a target video includes at least one of: determining a current time point as the selected time point when detecting that a control point for adjusting the play progress of the target video stays at the current time point for a time period greater than or equal to a predetermined time period threshold; and determining a time point currently corresponding to a control point as the selected time point when detecting that the user no longer controls the control point.

In some embodiments, before the determining the selected time point in a process that the user adjusts the play progress of the target video, the method further includes: detecting a time point to which the target video is adjusted in real time in the process that the user adjusts the play progress of the target video; and determining a target time point based on the detected time point, and displaying a video frame corresponding to the determined target time point in a second target display region.

In some embodiments, the determining a target time point based on the detected time point includes: determining, from time points respectively corresponding to key frames included in the key frame set, a time point having a difference meeting a second predetermined condition from the target time point as the target time point.

In some embodiments, the determining a target time point based on the detected time point includes: selecting a time point from a target time period which includes the detected time point as the target time point, where the target time period is included in a time period set which is obtained by dividing a play duration of the target video based on the key frame set.

In some embodiments, the determining a target time point based on the detected time point includes: obtaining processing capability information of a target processor, where the target processor processes a video frame included in the target video, and the processing capability information represents capability of the target processor to process information; and determining a detected time point as the target time point periodically based on a predetermined time period corresponding to the processing capability information.

In some embodiments, the determining a target time point based on the detected time point and displaying a video frame corresponding to the determined target time point in a second target display region includes: determining a currently detected time point as the target time point; performing the following displaying steps: decoding the video frame corresponding to the determined target time point to obtain a decoded video frame to be displayed in the second target display region and determining whether the second target display region includes the obtained decoded video frame; and determining a time point that is last detected as the target time point in a case that the second target display region includes the obtained decoded video frame, and performing the above displaying steps based on the determined target time point.

In a second aspect, an apparatus for displaying an image is provided according to an embodiment of the present disclosure. The apparatus includes a first determining unit, a second determining unit, a decoding unit, and a displaying unit. The first determining unit is configured to determine a selected time point in a process that a user adjusts a play progress of a target video, where the target video includes a key frame set. The second determining unit is configured to determine a target key frame from the key frame set, where a difference between a time point corresponding to the target key frame and the selected time point meets a first predetermined condition. The decoding unit is configured to decode a video frame corresponding to the selected time point based on the target key frame to obtain a decoded video frame. The displaying unit is configured to display the decoded video frame in a first target display region.

In some embodiments, the first determining unit includes at least one of a first determining module and a second determining module. The first determining module is configured to determine a current time point as the selected time point when it is detected that a control point for adjusting the play progress of the target video stays at the current time point for a time period greater than or equal to a predetermined time threshold. The second determining module is configured to determine a time point currently corresponding to a control point as the selected time point when it is detected that the user no longer controls the control point.

In some embodiments, the apparatus further includes a detecting unit and a second determining unit. The detecting unit is configured to detect a time point to which the target video is adjusted in real time in the process that the user adjusts the play progress of the target video. The second determining unit is configured to determine a target time point based on the detected time point detected and display a video frame corresponding to the determined target time point in a second target display region.

In some embodiments, the second determining unit is further configured to: determine, from time points respectively corresponding to key frames included in the key frame set, a time point having a difference meeting a second predetermined condition from the detected time point as the target time point.

In some embodiments, the second determining unit is further configured to: select a time point from a target time period which includes the detected time point as the target time point, where the target time period is included in a time period set which is obtained by dividing a play duration of the target video based on the key frame set.

In some embodiments, the second determining unit includes: an obtaining module and a third determining module. The obtaining module is configured to obtain processing capability information of a target processor, where the target processor is configured to process a video frame included in the target video, and the processing capability information represents capability of the target processor to process information. The third determining module is configured to determine a detected time point as the target time point periodically based on a predetermined time period corresponding to the processing capability information.

In some embodiments, the second determining unit includes: a fourth determining module, a displaying module, and a fifth determining module. The fourth determining module is configured to determine a currently detected time point as the target time point. The displaying module is configured to perform the following displaying steps: decoding the video frame corresponding to the determined target time point to obtain a decoded video frame to be displayed in the second target display region; and determining whether the second target display region includes the obtained decoded video frame. The fifth determining module is configured to determine a time point that is last detected as the target time point in a case that the second target display region includes the obtained decoded video frame, and perform the above displaying steps based on the determined target time point.

In a third aspect, a terminal device is provided according to an embodiment of the present disclosure. The terminal device includes one or more processors and a storage apparatus. The storage apparatus stores one or more programs. The one or more processors, when executing the one or more programs, perform the method according to any one of the above embodiments in the first aspect.

In a fourth aspect, a computer readable medium is provided according to an embodiment of the present disclosure. The computer readable medium stores a computer program that, when being executed by a processor, causes the processor to perform the method according to any one of the above embodiments in the first aspect.

With the method and the apparatus for displaying an image according to the embodiments of the present disclosure, a selected time point is determined in a process that a user adjusts a play progress of a target video, a key frame is determined from a key frame set included in the target video, a video frame corresponding to the selected time point is decoded based on the target key frame, and the decoded video frame is displayed in a first target display region. Therefore, when adjusting the play progress of the video, the user can preview the video frame corresponding to the selected time point based on the key frame without adding more key frames to the video in advance, thereby saving the time period required for adding key frames to the video in advance, improving flexibility of displaying video frames, and improving the efficiency of positioning and processing video frames.

BRIEF DESCRIPTION OF THE DRAWINGS

Further features, objects and advantages of the present disclosure will become more apparent by illustrating in detail the non-limiting embodiments with reference to accompanying drawings.

DETAILED DESCRIPTION OF THE EMBODIMENTS

The present disclosure is further described in detail below with reference to the accompanying drawings and embodiments. It should be understood that the specific embodiments described herein are only used for illustrating the disclosure, and are not intended to limit the disclosure. It also should be noted that, for the convenience of description, only parts related to the present disclosure are shown in the drawings.

It should be noted that the embodiments of the present disclosure and the features in the embodiments may be combined with each other without conflict. Hereinafter, the present disclosure is described in detail below with reference to the accompanying drawings in conjunction with the embodiments.

Figure 1:
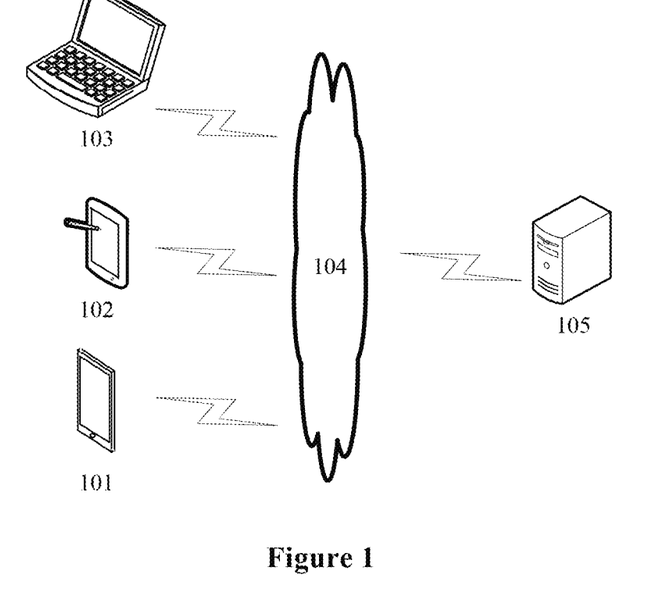
FIG. 1 is a diagram showing an exemplary system framework to which an embodiment of the present disclosure may be applied.

FIG. 1 shows an exemplary system framework 100 to which a method for displaying an image or an apparatus for displaying an image according to an embodiment of the present disclosure may be applied.

As shown in FIG. 1, the system framework 100 may include a terminal device 101, a terminal device 102, a terminal device 103, a network 104, and a server 105. The network 104 is configured to provide a medium for communication links between each of the terminal devices 101, 102, 103 and the server 105. The network 104 may include various types of connections, such as wired communication links, wireless communication links, or fiber optic cables.

A user may use the terminal devices 101, 102, and 103 to interact with the server 105 via the network 104, to receive or send messages. Various communication client applications, such as a video play application, a web browser application, and a social platform application, may be installed in the terminal devices 101, 102, and 103.

The terminal devices 101, 102, and 103 may be implemented as hardware or software. In a case that the terminal devices 101, 102, and 103 are implemented as hardware, the terminal devices 101, 102, and 103 may be various electronic devices having a display screen and supporting video playing, including but not limited to smart phones, tablet computers, laptop portable computers, desktop computers and the like. In a case that the terminal devices 101, 102, and 103 are implemented as software, the terminal devices 101, 102, and 103 may be installed on the above-exemplified electronic devices. The terminal devices 101, 102, and 103 may be implemented as multiple applications or software modules (for example, applications or software modules for providing distributed services), or may be implemented as a single application or software module, which is not limited in the present disclosure.

The server 105 may be a server that provides various services, such as a back-end video server that provides support for videos played on the terminal devices 101, 102, and 103. The back-end video server may send a video to a terminal device, and may receive a video from a terminal device.

It should be noted that, the method for displaying an image according to the embodiment of the present disclosure is generally performed by the terminal devices 101, 102, and 103. Accordingly, the apparatus for displaying an image is generally provided in the terminal devices 101, 102, and 103.

It should be noted that the server may be implemented as hardware or software. In a case that the server is implemented as hardware, the server may be implemented as a distributed server cluster including multiple servers or a single server. In a case that the server is implemented as software, the server may be implemented as multiple applications or software modules (for example, applications or software modules for providing distributed services), or may be implemented as a single application or software module, which is not limited in the present disclosure.

It should be understood that the number of terminal devices, the number of networks, and the number of servers in FIG. 1 are only illustrative. The number of terminal devices, the number of networks, and the number of servers may be arbitrary according to implementation requirements. In a case that the to-be-processed video is not obtained remotely, the above system framework may not include the server and the network.

Figure 2:
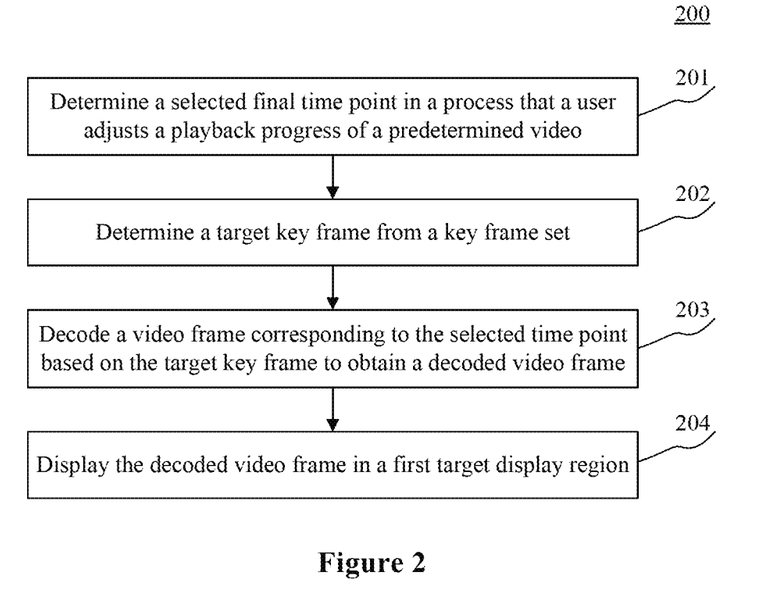
FIG. 2 is a flow chart showing a method for displaying an image according to an embodiment of the present disclosure.

Reference is made to FIG. 2, which shows a flow 200 of a method for displaying an image according to an embodiment of the present disclosure. The method for displaying an image includes the following steps 201 to 204.

In step 201, a selected time point is determined in a process that a user adjusts a play progress of a target video.

In this embodiment, an execution body (for example, the terminal device shown in FIG. 1) of the method for displaying an image may determine the selected time point in the process that the user adjusts the play progress of the target video. The target video may be a video including video frames from which a video frame is to be selected to be displayed in a first target display region. For example, the target video may be a video obtained remotely via a wireless connection or a wired connection, or may be a video pre-stored locally (for example, a video recorded by the user using the execution body). It should be noted that the target video in this embodiment is usually a compressed video, for example, a video obtained by compressing an original video based on the conventional H26X coding standard.

The target video includes a key frame set. The key frame (also called a frame I) is a frame that includes complete image data in the compressed video. The key frame may be decoded only based on image data of the key frame.

In practice, the compressed video may include a frame P and a frame B. Data included in the frame P (also called a difference frame) represents a difference between the frame P and a previous key frame (or a frame P). When the frame P is decoded, the data included in this frame is superimposed on a previously buffered image to generate a final image. That is, the frame P does not include complete image data, and only includes data representing the difference between the frame P and a previous frame. Data included in the frame B (also called a dual difference frame) represents a difference between the frame B and a previous frame and a difference between the frame B and a next frame. That is, when the frame B is decoded, both a previous image and a next image are required. A final image is obtained by superimposing the image data included in the frame B on the previous image and the next frame. A compressed video usually includes multiple key frames, and includes multiple frames P and frames B between key frames. For example, in a case that a video frame sequence includes video frames arranged as IBBPBBPBBP, images corresponding to the frames B and the frames P may be obtained by performing decoding based on the frame I.

The selected time point is a play time point selected by the user while adjusting the play progress of the target video. Generally, the user may drag a progress bar of the target video or perform a sliding operation on a screen displaying the target video to adjust the play progress of the target video. It should be noted that the user may use an electronic device, such as a mouse, to adjust the play progress of the target video. In a case that the execution body includes a touch screen, the user may adjust the play progress by sliding a finger on the touch screen.

In some implementations of this embodiment, the execution body may determine the selected time point according to at least one of the following manners.

In a first manner, a current time point is determined as the selected time point when it is detected that a control point for adjusting the play progress of the target video stays at the current time point for a time period greater than or equal to a predetermined time period threshold. The control point may be a point displayed on the screen (for example, a point displayed on the progress bar for indicating a current play progress), or a point that is not displayed (for example, a point at which the finger touches the screen displaying the video when the user slides the finger on the screen). The user may drag the control point by clicking a mouse or touching the screen to adjust the play progress. The time period threshold may be predetermined by a technician. For example, the time period threshold may be set to 2 seconds or 5 seconds.

In a second manner, a time point currently corresponding to the control point is determined as the selected time point when it is detected that the user no longer controls the control point. Specifically, the execution body may detect in real time whether the user clicks the control point or touches the control point. For example, when detecting that the user lifts the finger or releases the button on the mouse, the execution body determines that the user no longer controls the control point, and the current play time point is determined as the selected time point.

In step 202, a target key frame is determined from the key frame set.

In this embodiment, the execution body of the method for displaying an image may determine the target key frame from the key frame set based on the selected time point determined in step 201. A difference between a time point corresponding to the target key frame and the selected time point meets a first predetermined condition. The first predetermined condition may include at least one of: a condition that the time point corresponding to the key frame is earlier than the selected time point and has a smallest difference from the selected time point; and a condition that the time point corresponding to the key frame is earlier than the selected time point and the difference between the time point corresponding to the key frame and the selected time point is less than or equal to a predetermined time difference threshold.

In step 203, a video frame corresponding to the selected time point is decoded based on the target key frame to obtain a decoded video frame.

In this embodiment, the execution body of the method for displaying an image may decode the video frame corresponding to the selected time point based on the key frame determined in step 202, to obtain the decoded video frame. Specifically, for example, it is assumed that the target video includes a key frame, a frame P, and a frame B. If the video frame corresponding to the selected time point is the key frame, the video frame may be decoded according to the manner of decoding a key frame. If the video frame corresponding to the selected time point is the frame P or the frame B, based on the target key frame, the video frame may be decoded according to the manner of decoding a frame P or decoding a frame B. It should be noted that the manners of decoding a frame I, decoding a frame P, and decoding a frame B are conventional technologies that are currently widely studied and applied, and are not described in detail herein.

In step 204, the decoded video frame is displayed in a first target display region.

In this embodiment, the execution body may display the decoded video frame obtained in step 203 in the first target display region. The first target display region may be a display region for displaying a decoded video frame. For example, the first target display region may be a region where a video is played on the screen or another region on the screen (for example, a window for the user to process the decoded video frame).

Generally, the time period for decoding a key frame is less than a time period for decoding a frame P or a frame B. Therefore, in order to help the user in quickly and accurately previewing the video frame corresponding to the play time point selected by the user, the video is usually pre-processed in advance so that more key frames are added to the video or each video frame is set as a key frame according to the conventional technology, which is time-consuming. With the above steps according to the present disclosure, it is only required to determine the time point selected by the user and display the video frame corresponding to the selected time point without pre-processing the video, thereby improving the efficiency of video processing.

Figure 3:
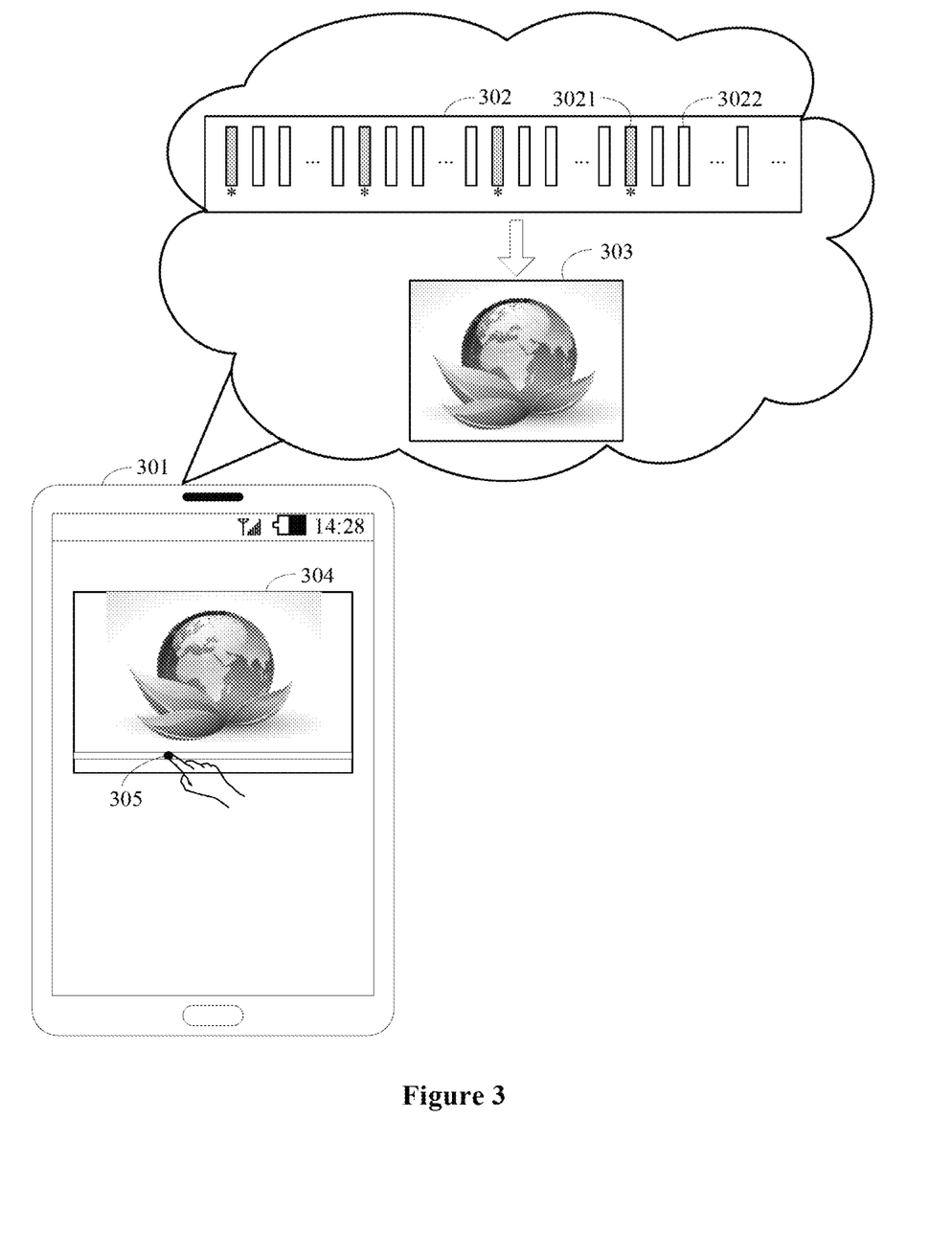
FIG. 3 is a schematic diagram showing an application scenario of a method for displaying an image according to an embodiment of the present disclosure.

Reference is made to FIG. 3, which shows a schematic diagram of an application scenario of a method for displaying an image according to an embodiment of the present disclosure. In the application scenario shown in FIG. 3, the user records a piece of video 302 using the terminal device 301 in advance, and the video 302 includes a predetermined key frame set (for example, including frames indicated by a symbol "*" in FIG. 3). The user is to extract a video frame from the video 302 for processing (for example, adding special effects to the video frame). The user adjusts the play progress of the video 302 by dragging a progress bar of the video 302. When the finger of the user leaves the screen, the terminal device 301 determines that a play time point to which the user last drags the progress bar is the selected time point (for example, the play time point corresponding to a point 305 to which the progress bar is dragged shown in FIG. 3), and the video frame corresponding to the selected time point is a frame 3022 shown in FIG. 3. Then, the terminal device 301 determines the target key frame from the key frame set. The target key frame is a key frame 3021, and a difference between the time point corresponding to the key frame 3021 and the selected time point meets the first predetermined condition (for example, the time point corresponding to the key frame 3021 is earlier than the selected time point and has a smallest difference from the selected time point). Next, based on the target key frame 3021, the terminal device 301 decodes the video frame 3022 corresponding to the selected time point to obtain a decoded video frame 303, and displays the decoded video frame 303 in a first target display region 304 (for example, a window for playing a video).

In the method according to the embodiments of the present disclosure, a selected time point is determined in a process that a user adjusts a play progress of a target video, a key frame is determined from a key frame set included in the target video, a video frame corresponding to the selected time point is decoded based on the target key frame, and the decoded video frame is displayed in a first target display region. Therefore, when adjusting the play progress of the video, the user can preview the video frame corresponding to the selected time point based on the key frame without adding more key frames to the video in advance, thereby saving the time period required for adding key frames to the video in advance, improving the flexibility of displaying video frames, and improving the efficiency of positioning and processing video frames.

Figure 4:
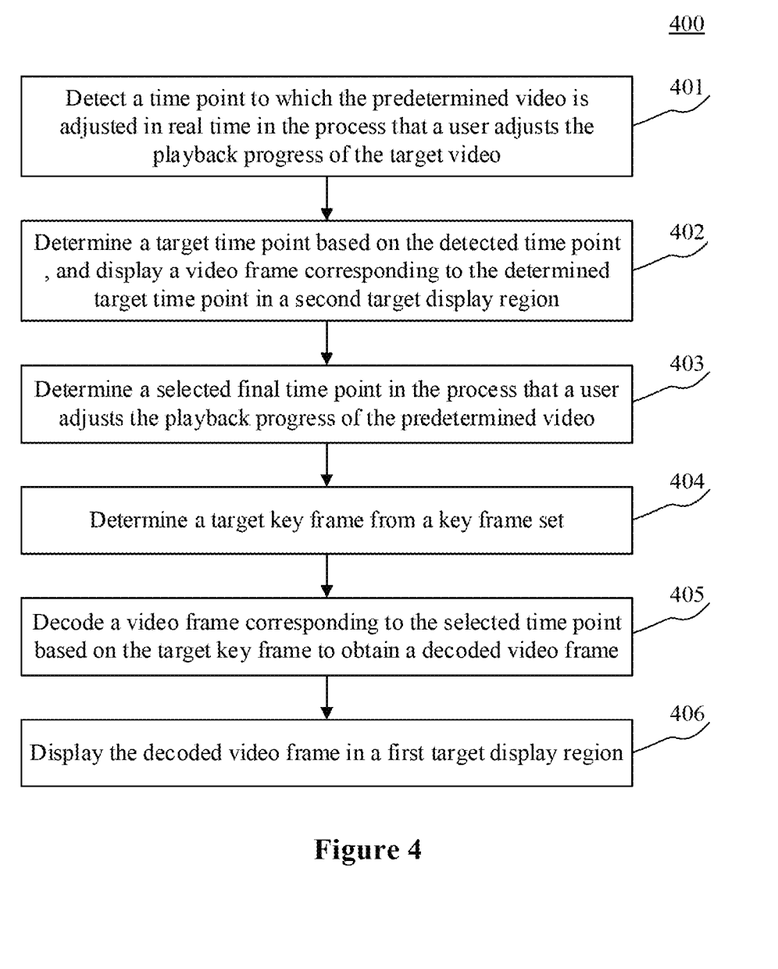
FIG. 4 is a flow chart showing a method for displaying an image according to another embodiment of the present disclosure.

Reference is made to FIG. 4, which shows a flow 400 of a method for displaying an image according to another embodiment of the present disclosure. The flow 400 of the method for displaying an image includes the following steps 401 to 406.

In step 401, in the process that the user adjusts the play progress of the target video, a time point to which the target video is adjusted is detected in real time.

In this embodiment, the execution body (for example, the terminal device shown in FIG. 1) of the method for displaying an image may detect a time point to which the target video is adjusted in real time in the process that the user adjusts the play progress of the target video. The target video may be a video obtained remotely via a wireless connection or a wired connection, or may be a video pre-stored locally (for example, a video recorded by the user using the execution body). The manners according to which the user adjusts the play progress of the target video may be the same as the manners described in the embodiment corresponding to FIG. 2, which are not described here again.

The target video includes a key frame set. The key frame (also called a frame I) is a frame that includes complete image data in a compressed video. The key frame may be decoded only based on the image data of the key frame.

The time point to which the target video is adjusted may be a play time point detected in real time in the process that the user adjusts the play progress of the target video. Generally, the user may drag a progress bar of the target video or perform a sliding operation on a screen displaying the target video to adjust the play progress of the target video. It should be noted that the user may use an electronic device, such as a mouse, to adjust the play progress of the target video. In a case that the execution body includes a touch screen, the user may adjust the play progress by sliding a finger on the touch screen.

In step 402, a target time point is determined based on the detected time point, and a video frame corresponding to the determined target time point is displayed in a second target display region.

In this embodiment, the execution body may determine the target time point based on the detected time point by using various methods, and may display the video frame corresponding to the determined target time point in the second target display region. The second target display region may be a display region for previewing the video frame corresponding to the target time point. It should be noted that the second target display region may be a display region (for example, a preview window) different from the first target display region, or may be the same display region (for example, a display region for playing the target video) as the first target display region.

In some implementations of this embodiment, the execution body may determine the target time point as follows. The execution body determines, from time points respectively corresponding to key frames included in the key frame set, a time point having a difference meeting a second predetermined condition from the detected time point as the target time point. Specifically, the second predetermined condition may include at least one of: a condition that a difference between the time point corresponding to the key frame and the detected time point is the smallest; and a condition that a difference between the time point corresponding to the key frame and the detected time point is less than or equal to a predetermined period threshold. The difference may be an absolute value of a difference between the time point corresponding to the key frame and the detected time point. That is, the target time point may be earlier or later than the detected time point. Since the key frame is decoded quickly, the key frame may be displayed in real time in the process that the user adjusts the play progress of the target video, thereby helping the user in determining the currently adjusted play progress.

In some implementations of this embodiment, the execution body may determine the target time point as follows. The execution body selects a time point from a target time period which includes the detected time point as the target time point. The target time period is included in a time period set which is obtained by dividing a play duration of the target video based on the key frame set. For example, it is assumed that the target video includes N (N is a positive integer) key frames (where a first frame is a key frame), the entire play duration of the target video may be divided based on the time points respectively corresponding to the N key frames to obtain N time periods (that is, to obtain the time period set). The execution body may determine a time period which includes the detected time point as the target time period, and select a time point from the target time period as the target time point in various manners. For example, the execution body may select a time point in the middle of the target time period from the target time period as the target time point, or randomly select a time point from the target time period as the target time point.

In some implementations of this embodiment, the execution body may determine the target time point as follows. First, the execution body obtains processing capability information of a target processor. Specifically, the execution body may obtain the processing capability information remotely or locally. The target processor may be arranged in the execution body, and may be configured to process a video frame included in the target video. The processing capability information may represent the capability (for example, including a processing speed and a cache size) of the target processor to process information. The processing capability information may include, but is not limited to, at least one of a model of the target processor, a main frequency of the target processor, the number of cores of the target processor, and the like.

Next, the execution body determines a detected time point as the target time point periodically based on a predetermined time period corresponding to the processing capability information. For example, the correspondence relationship between processing capability information and the predetermined time period may be represented by a correspondence table including multiple pieces of processing capability information and multiple predetermined time periods. The execution body may search for the predetermined time period corresponding to the determined processing capability information from the correspondence table, and determine a detected time point as the target time point periodically based on the predetermined time period. It should be understood that a weak processing capability (for example, a low main frequency value) represented by the processing capability information corresponds to a long predetermined time period, so that the number of times that the target processor processes the video frame may be reduced in a case that the target processor has a low processing capability, alleviating a load of the target processor.

Figure 5:
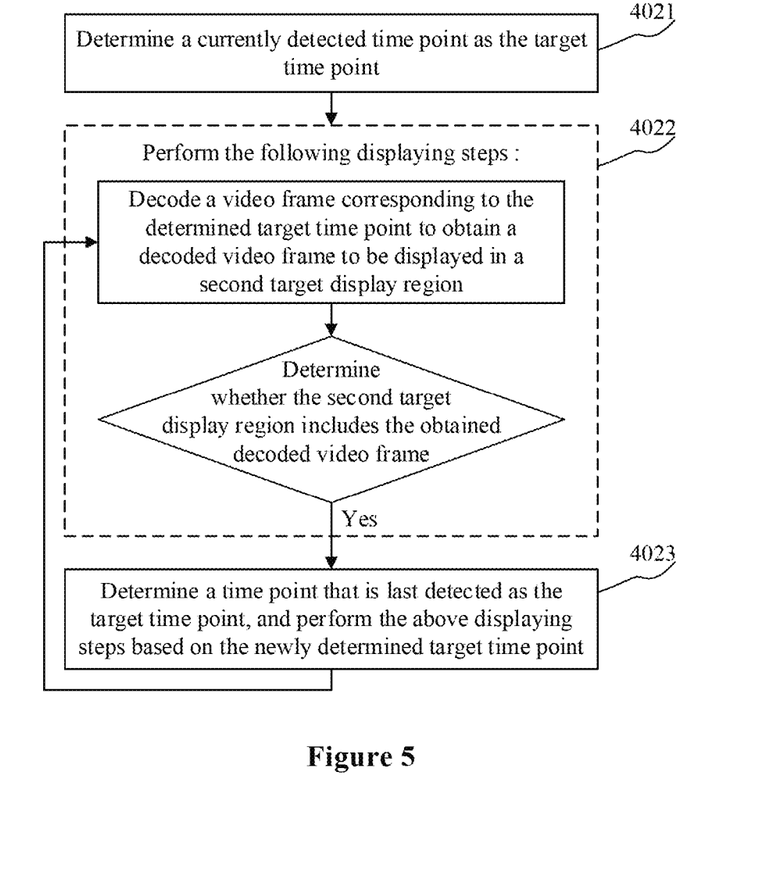
FIG. 5 is a flow chart showing determination of a target time point in a method for displaying an image according to an embodiment of the present disclosure.

In some implementations of this embodiment, as shown in FIG. 5, the step 402 may be performed according to the following steps 4021 to 4023.

In step 4021, a currently detected time point is determined as the target time point.

Specifically, the execution body, when detecting that the user adjusts the play progress of the target video with the control point described in the embodiment corresponding to FIG. 2, usually determines a time point that is detected firstly as the target time point.

In step 4022, the following displaying steps are performed. The video frame corresponding to the determined target time point is decoded to obtain a decoded video frame to be displayed in the second target display region; and it is determined whether the second target display region includes the obtained decoded video frame.

Specifically, the execution body may decode the video frame corresponding to the determined target time point to obtain the decoded video frame. If the video frame corresponding to the determined target time point is a key frame, the video frame may be decoded according to the manner of decoding a key frame. If the video frame corresponding to the determined target time point is a frame P or a frame B, the video frame may be decoded according to the manner of decoding a frame P or decoding a frame B. Generally, before decoding a frame P or a frame B, a key frame corresponding to a time point that is earlier than the determined target time point and has a smallest difference from the determined target time point is determined as the key frame for decoding. Then, based on the determined key frame for decoding, the key frame for decoding is decoded according to the manner of decoding a frame P or decoding a frame B to obtain a decoded video frame.

Next, the execution body may determine whether the decoded video frame is displayed in the second target display region. If the decoded video frame is displayed in the second target display region, it is determined that the second target display region includes the video frame corresponding to the determined target time point.

In step 4023, a time point that is last detected is determined as the target time point in a case that the second target display region includes the obtained decoded video frame, and the above displaying steps (that is, step 4022) are performed based on the determined target time point.

Specifically, the time point detected in the process that the user adjusts the play progress of the target video varies with time. When determining in step 4022 that the decoded video frame obtained is displayed in the second target display region, the execution body may determine the time point that is last detected as the target time point, and proceed to step 4022 based the determined target time point.

Generally, when determining that the second target display region does not include the video frame corresponding to the determined target time point (that is, the video frame corresponding to the target time point has not been decoded and displayed), the execution body may wait for the video frame corresponding to the target time point to be decoded.

Only one video frame is processed when performing steps 4022 and 4023 without decoding all video frames. Therefore, with this implementation of the embodiment, processing lag (such as the processing lag while moving the control point) caused by processing a large number of video frames can be avoided, and processors with different processing capabilities can perform this implementation.

In step 403, a selected time point is determined in the process that the user adjusts the play progress of the target video.

In this embodiment, step 403 is substantially the same as step 201 in the embodiment corresponding to FIG. 2, and is not described in detail herein.

In step 404, a target key frame is determined from the key frame set.

In this embodiment, step 404 is substantially the same as step 202 in the embodiment corresponding to FIG. 2, and is not described in detail herein.

In step 405, a video frame corresponding to the selected time point is decoded based on the target key frame to obtain a decoded video frame.

In this embodiment, step 405 is substantially the same as step 203 in the embodiment corresponding to FIG. 2, and is not described in detail herein.

In step 406, the decoded video frame is displayed in a first target display region.

In this embodiment, step 406 is substantially the same as step 204 in the embodiment corresponding to FIG. 2, and is not described in detail herein.

As can be seen from FIG. 4, compared with the embodiment corresponding to FIG. 2, the flow 400 of the method for displaying an image in this embodiment highlights the step of previewing the video frame in the process that the user adjusts the play progress of the target video. Therefore, with the method described in this embodiment, the video frame can be previewed in real time in the process that the user adjusts the play progress of the video frame without adding key frames to the target video in advance, thereby further improving the flexibility of displaying video frames, and helping the user in accurately positioning the video frame corresponding to the selected time point.

Figure 6:
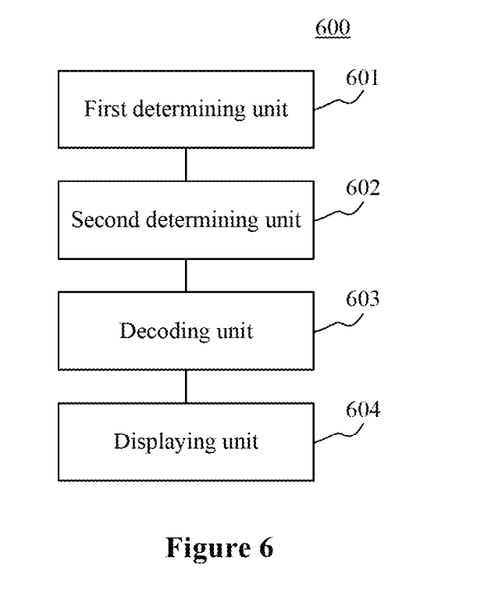
FIG. 6 is a schematic structural diagram showing an apparatus for displaying an image according to an embodiment of the present disclosure.

Referring to FIG. 6, an apparatus for displaying an image is provided according to an embodiment of the present disclosure, to implement the method shown in the above embodiments. The embodiment of the apparatus corresponds to the embodiment of the method shown in FIG. 2, and the apparatus can be applied to various electronic devices.

As shown in FIG. 6, an apparatus 600 for displaying an image according to this embodiment includes: a first determining unit 601, a second determining unit 602, a decoding unit 603, and a displaying unit 604. The first determining unit 601 is configured to determine a selected time point in a process that a user adjusts a play progress of a target video, where the target video includes a key frame set. The second determining unit 602 is configured to determine a target key frame from the key frame set, where a difference between a time point corresponding to the target key frame and the selected time point meets a first predetermined condition. The decoding unit 603 is configured to decode a video frame corresponding to the selected time point based on the target key frame to obtain a decoded video frame. The displaying unit 604 is configured to display the decoded video frame in a first target display region.

In this embodiment, the first determining unit 601 may determine the selected time point in the process that the user adjusts the play progress of the target video. The target video may be a video including video frames from which a video frame is to be selected to be displayed in a first target display region. For example, the target video may be a video obtained remotely via a wireless connection or a wired connection, or may be a video pre-stored locally (for example, a video recorded by the user using the apparatus 600). It should be noted that the target video in this embodiment is usually a compressed video, for example, a video obtained by compressing an original video based on the conventional H26X coding standard.

The target video includes a key frame set. The key frame (also called a frame I) is a frame that includes complete image data in the compressed video. The key frame may be decoded only based on the image data of the key frame.

The selected time point is a play time point selected by the user while adjusting the play progress of the target video. For example, the user may drag a progress bar of the target video or perform a sliding operation on a screen displaying the target video to adjust the play progress of the target video. It should be noted that the user may use an electronic device, such as a mouse, to adjust the play progress of the target video. In a case that the apparatus 600 includes a touch screen, the user may adjust the play progress by sliding a finger on the touch screen.

In this embodiment, the second determining unit 602 may determine the target key frame from the key frame set. A difference between a time point corresponding to the target key frame and the selected time point meets a first predetermined condition. The target key frame is determined from the key frame set. The difference between the time point corresponding to the target key frame and the selected time point meets the first predetermined condition. The first predetermined condition may include at least one of: a condition that the time point corresponding to the key frame is earlier than the selected time point and has a smallest difference from the selected time point; and a condition that the time point corresponding to the key frame is earlier than the selected time point and the difference between the time point corresponding to the key frame and the selected time point is less than or equal to a predetermined time difference threshold.

In this embodiment, the decoding unit 603 may decode the video frame corresponding to the selected time point to obtain the decoded video frame. Specifically, for example, it is assumed that the target video includes a key frame, a frame P, and a frame B. If the video frame corresponding to the selected time point is the key frame, the video frame may be decoded according to the manner of decoding a key frame. If the video frame corresponding to the selected time point is the frame P or the frame B, based on the target key frame, the video frame may be decoded according to the manner of decoding a frame P or decoding a frame B. It should be noted that the manners of decoding a frame I, decoding a frame P, and decoding a frame B are conventional technologies that are currently widely studied and applied, and are not described in detail herein.

In this embodiment, the displaying unit 604 may display the decoded video frame obtained by the decoding unit 603 in a first target display region. The first target display region may be a display region for displaying a decoded video frame. For example, the first target display region may be a region where a video is played on the screen or another region on the screen (for example, a window for processing the decoded video frame by the user).

Generally, the time period for decoding a key frame is less than a time period for decoding a frame P or a frame B. Therefore, in order to help the user in quickly and accurately previewing the video frame corresponding to the play time point selected by the user, the video is usually pre-processed in advance so that more key frames are added to the video or each video frame is set as a key frame according to the conventional technology, which is time-consuming. With the above steps according to the present disclosure, it is only required to determine the time point selected by the user and display the video frame corresponding to the selected time point without pre-processing the video in advance, thereby improving the efficiency of video processing.

In some implementations of this embodiment, the first determining unit 601 includes at least one of a first determining module (not shown in the drawings) and a second determining module (not shown in the drawings). The first determining module is configured to determine a current time point as the selected time point when it is detected that a control point for adjusting the play progress of the target video stays at the current time point for a time period greater than or equal to a predetermined time period threshold. The second determining module is configured to determine a time point currently corresponding to a control point as the selected time point when it is detected that the user no longer controls the control point.

In some implementations of the present embodiment, the apparatus 600 may further include: a detecting unit (not shown in the drawings) and a second determining unit (not shown in the drawings). The detecting unit is configured to detect a time point to which the target video is adjusted in real time in the process that the user adjusts the play progress of the target video. The second determining unit is configured to determine a target time point based on the detected time point and display a video frame corresponding to the determined target time point in a second target display region.

In some implementations of this embodiment, the second determining unit 602 may be further configured to: determine, from time points respectively corresponding to key frames included in the key frame set, a time point having a difference meeting a second predetermined condition from the detected time point as the target time point.

In some implementations of this embodiment, the second determining unit 602 may be further configured to: select a time point from a target time period which includes the detected time point as the target time point, where the target time period is included in a time period set which is obtained by dividing a play duration of the target video based on the key frame set.

In some implementations of this embodiment, the second determining unit 602 may include: an obtaining module (not shown in the drawings) and a third determining module (not shown in the drawings). The obtaining module is configured to obtain processing capability information of a target processor, where the target processor is configured to process a video frame included in the target video, and the processing capability information represents capability of the target processor to process information. The third determining module is configured to determine a detected time point as the target time point periodically based on a predetermined time period corresponding to the processing capability information.

In some implementations of this embodiment, the second determining unit 602 may include: a fourth determining module (not shown in the drawings), a displaying module (not shown in the drawings), and a fifth determining module (not shown in the drawings). The fourth determining module is configured to determine a currently detected time point as the target time point. The displaying module is configured to perform the following displaying steps: decoding the video frame corresponding to the determined target time point to obtain a decoded video frame to be displayed in the second target display region; and determining whether the second target display region includes the obtained decoded video frame. The fifth determining module is configured to determine a time point that is last detected as a target time point in a case that the second target display region includes the obtained decoded video frame, and proceed to the above displaying steps based on the determined target time point.

With the apparatus according to the embodiments of the present disclosure, a selected time point is determined in a process that a user adjusts a play progress of a target video, a key frame is determined from a key frame set included in the target video, a video frame corresponding to the selected time point is decoded based on the target key frame, and the decoded video frame is displayed in a first target display region. Therefore, when adjusting the play progress of the video, the user can preview the video frame corresponding to the selected time point based on the key frame without adding more key frames to the video in advance, thereby saving the time period required for adding key frames to the video in advance, improving the flexibility of displaying video frames, and improving the efficiency of positioning and processing video frames.

Figure 7:
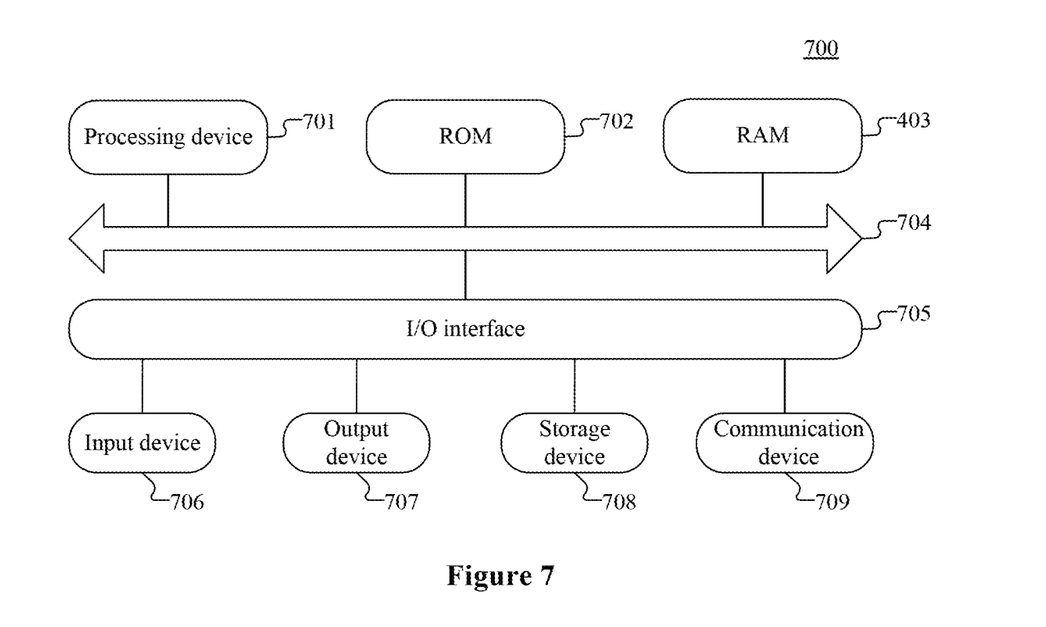
FIG. 7 is a schematic structural diagram showing a computer system for implementing a terminal device according to an embodiment of the present disclosure.

Reference is made to FIG. 7, which is a schematic structural diagram of a terminal device 700 for implementing the embodiments of the present disclosure. The terminal device in the embodiments of the present disclosure may include, but is not limited to, a mobile terminal such as a mobile phone, a notebook computer, a digital broadcast receiver, a PDA (personal digital assistant), a PAD (tablet), a PMP (portable multimedia player) and a vehicle-mounted terminal (for example, a vehicle-mounted navigation terminal), and a fixed terminal such as a digital TV and a desktop computer. The electronic device shown in FIG. 7 is only an example, and should not limit the function and scope of use of the embodiments of the present disclosure.

As shown in FIG. 7, the terminal device 700 may include a processing device 701 (such as a central processing unit and a graphics processing unit), and the processing device 701 can perform various appropriate actions and processes based on a program stored in a read-only memory (ROM) 702 or a program loaded in a random-access memory (RAM) 703 from a storage device 708. The RAM 703 also stores various programs and data required by the terminal device 700 for operation. The processing device 701, the ROM 702, and the RAM 703 are connected to each other via a bus 704. An input/output (I/O) interface 705 is also connected to the bus 704.

Generally, the following devices may be connected to the I/O interface 705: an input device 706 including such as a touch screen, a touch pad, a keyboard, a mouse, a camera, a microphone, an accelerometer and a gyroscope, an output device 707 including such as a liquid crystal display (LCD), a speaker and a vibrator, a storage device 708 including such as magnetic tape and a hard disk, and a communication device 709. The communication device 709 may allow the terminal device 700 to perform wireless or wired communication with other devices to exchange data. Although FIG. 7 shows a terminal device 700 including various devices, it should be understood that the terminal device 700 is not required to implement or include all the devices shown in FIG. 7. The terminal device 700 may optionally implement these devices or include more or fewer devices.

In particular, the processes, described above with reference to flow charts, may be implemented as a computer software program according to an embodiment of the present disclosure. For example, a computer program product is provided according to an embodiment of the present disclosure, the computer program product includes a computer program embodied on a computer readable medium, and the computer program includes program codes for performing the method illustrated in the flow charts. In the embodiment, the computer program can be downloaded from a network via the communication device 709, and be installed, or the computer program can be read from the storage device 708, and be installed, or the computer program can be read from the ROM 702, and be installed. If the computer program is executed by the processing device 701, the above-described functions defined in the method of the present disclosure are implemented.

It should be noted that the computer readable medium provided according to the present disclosure, may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a random-access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the foregoing. In the present disclosure, the computer readable storage medium can be any tangible medium containing or storing a program, where the program can be used by an instruction execution system, apparatus or device or used in combination therewith. In the present disclosure, the computer readable signal medium may include a data signal with a computer readable program code embodied therein. The data signal may be transmitted in a baseband or as part of a carrier wave. The data signal may be in variety forms, including but not limited to, electromagnetic signals, optical signals, or any suitable combination of the foregoing. The computer readable signal medium may be any computer readable medium other than the computer readable storage medium, and the computer readable medium may be used for transmitting a program used by an instruction execution system, apparatus or device or used in combination therewith. The program code embodied in the computer readable medium may be transmitted via any appropriate medium, including but not limited to wireless, wired, optical fiber cable, RF (radio frequency), or any suitable combination of the foregoing.

The computer readable medium may be included in the terminal device, or may be separate and not included in the terminal device. The computer readable medium stores one or more programs. The terminal device, when executing the one or more programs performs the following steps of: determining a selected time point in a process that a user adjusts a play progress of a target video, where the target video includes a key frame set; determining a target key frame from the key frame set, where a difference between a time point corresponding to the target key frame and the selected time point meets a first predetermined condition; decoding a video frame corresponding to the selected time point based on the target key frame to obtain a decoded video frame; and displaying the decoded video frame in a first target display region.

Computer program code for performing operations of the present disclosure may be written in one or more programming languages, or a combination of the one or more programming languages. The programming language includes object oriented programming languages, such as Java, Smalltalk, and C++, also includes conventional procedural programming languages, such as "C" language or similar programming languages. The program code may be executed entirely on a user computer, or be executed partly on the user computer, or be executed as a stand-alone software package, or be executed partly on the user computer and partly on a remote computer, or be executed entirely on a remote computer or server. In the case that the execution of the program code involves a remote computer, the remote computer may be connected to the user computer via any kind of network, including a local area network (LAN) or a wide area network (WAN), or may be connected to an external computer (for example, via an Internet providing by an Internet service provider).

The flow charts and block diagrams in the drawings show the frameworks, functions and operations of possible implementations of the system, the method and the computer program product provided according to the embodiments of the present disclosure. Each block in the flow charts or block diagrams may represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and may sometimes be executed in a reverse order, which depending upon the functions involved.

It also should be noted that each block in the block diagrams and/or flow charts, and combinations of blocks in the block diagrams and/or flowcharts, may be implemented by a dedicated hardware-based system which is configured to implement specified functions or operations, or may be implemented by using a combination of dedicated hardware and computer instructions.

Units involved in the embodiments of the present disclosure may be implemented by software or by hardware. The name of the unit do not in any way constitute a limitation on the unit itself. For example, the first determining unit may also be named "a unit for determining a selected time point in a process that a user adjusts a play progress of a target video".

The above are only preferred embodiments of the present disclosure and are descriptions of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

The invention claimed is:

1. A method for displaying an image, comprising:
   determining a selected time point in a process that a user adjusts a play progress of a target video, wherein the target video comprises a key frame set;
   determining a target key frame from the key frame set, wherein a difference between a time point corresponding to the target key frame and the selected time point meets a first predetermined condition;
   decoding a video frame corresponding to the selected time point based on the target key frame to obtain a decoded video frame; and
   displaying the decoded video frame in a first target display region.

2. The method according to claim 1, wherein the determining a selected time point in a process that a user adjusts a play progress of a target video comprises at least one of:
   determining a current time point as the selected time point when detecting that a control point for adjusting the play progress of the target video stays at the current time point for a time period greater than or equal to a predetermined time period threshold; and
   determining a time point currently corresponding to a control point as the selected time point when detecting that the user no longer controls the control point.

3. The method according to claim 1, wherein before the determining the selected time point in a process that the user adjusts the play progress of the target video; the method further comprises:
   detecting a time point to which the target video is adjusted in real time in the process that the user adjusts the play progress of the target video; and
   determining a target time point based on the detected time point, and displaying a video frame corresponding to the determined target time point in a second target display region.

4. The method according to claim 3, wherein the determining a target time point based on the detected time point comprises:
   determining, from time points respectively corresponding to key frames comprised in the key frame set, a time point having a difference meeting a second predetermined condition from the detected time point as the target time point.

5. The method according to claim 3, wherein the determining a target time point based on the detected time point comprises:
   selecting a time point from a target time period which comprises the detected time point as the target time point, wherein the target time period is comprised in a time period set which is obtained by dividing a play duration of the target video based on the key frame set.

6. The method according to claim 3, wherein the determining a target time point based on the detected time point comprises:
   obtaining processing capability information of a target processor, wherein the target processor processes a video frame comprised in the target video, and the processing capability information represents capability of the target processor to process information; and
   determining a detected time point as the target time point periodically based on a predetermined time period corresponding to the processing capability information.

7. The method according to claim 3, wherein the determining a target time point based on the detected time point and displaying a video frame corresponding to the determined target time point in a second target display region comprises:
   determining a currently detected time point as the target time point;
   performing the following displaying steps of:
      decoding the video frame corresponding to the determined target time point to obtain a decoded video frame to be displayed in the second target display region; and
      determining whether the second target display region comprises the obtained decoded video frame; and
   determining a time point that is last detected as the target time point in a case that the second target display region comprises the obtained decoded video frame, and performing the above displaying steps based on the determined target time point.

8. An apparatus for displaying an image, comprising:
   one or more processors, and
   a storage apparatus storing one or more programs, wherein
   the one or more processors, when executing the one or more programs, perform to:
   determine a selected time point in a process that a user adjusts a play progress of a target video, wherein the target video comprises a key frame set;
   determine a target key frame from the key frame set, wherein a difference between a time point corresponding to the target key frame and the selected time point meets a first predetermined condition;
   decode a video frame corresponding to the selected time point based on the tareet key frame to obtain a decoded video frame; and
   display the decoded video frame in a first target display region.

9. The apparatus according to claim 8, wherein
the one or more processors, when executing the one or more programs, perform to:
   determine a current time point as the selected time point when it is detected that a control point for adjusting the play progress of the target video stays at the current time point for a time period greater than or equal to a predetermined time period threshold; and determine a time point currently corresponding to a control point as the selected time point when it is detected that the user no longer controls the control point.

10. The apparatus according to claim 8, wherein the one or more processors, when executing the one or more programs, perform to:

detect a time point to which the target video is adjusted in real time in the process that the user adjusts the play progress of the target video; and determine a target time point based on the detected time point and display a video frame corresponding to the determined target time point in a second target display region.

11. The apparatus according to claim 10, wherein the one or more processors, when executing the one or more programs, perform to:

determine, from time points respectively corresponding to key frames comprised in the key frame set, a time point having a difference meeting a second predetermined condition from the detected time point as the target time point.

12. The apparatus according to claim 10, wherein the one or more processors, when executing the one or more programs, perform to:

select a time point from a target time period which comprises the detected time point as the target time point, wherein the target time period is comprised in a time period set which is obtained by dividing a play duration of the target video based on the key frame set.

13. The apparatus according to claim 10, wherein the one or more processors, when executing the one or more programs, perform to:

obtain processing capability information of a target processor, wherein the target processor is configured to process a video frame comprised in the target video, and the processing capability information represents capability of the target processor to process information; and determine the detected time point as a target time point periodically based on a predetermined time period corresponding to the processing capability information.

14. The apparatus according to claim 10, wherein the one or more processors, when executing the one or more programs, perform to:

determine a currently detected time point as the target time point;

perform the following displaying steps of:

decoding the video frame corresponding to the determined target time point to obtain a decoded video frame to be displayed in the second target display region; and determining whether the second target display region comprises the obtained decoded video frame; and determine a time point that is last detected as the target time point in a case that the second target display region comprises the obtained decoded video frame, and perform the above displaying steps based on the determined target time point.

15. A non-transitory computer readable medium, storing a computer program, wherein the computer program, when being executed by a processor, causes the processor to perform operations comprising:

determining a selected time point in a process that a user adjusts a play progress of a target video, wherein the target video comprises a key frame set;

determining a target key frame from the key frame set, wherein a difference between a time point corresponding to the target key frame and the selected time point meets a first predetermined condition;

decoding a video frame corresponding to the selected time point based on the target key frame to obtain a decoded video frame; and displaying the decoded video frame in a first target display region.

* * * * *